Figure 1:
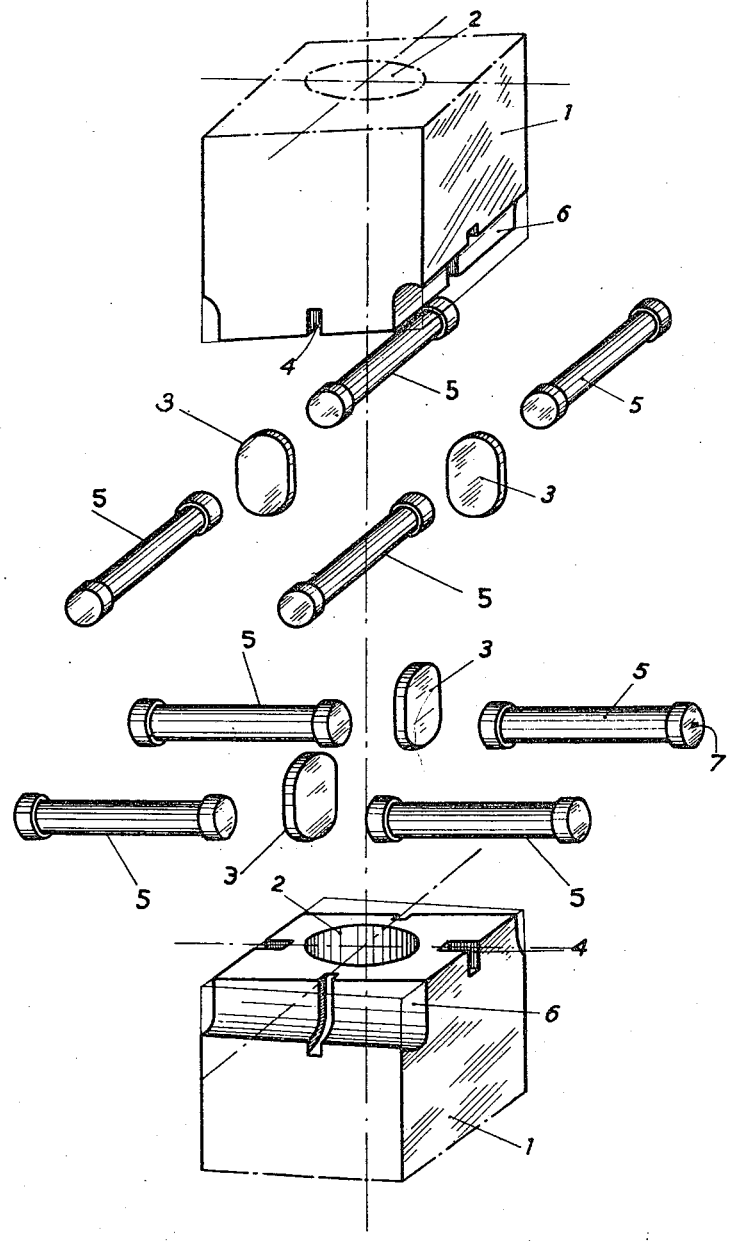

Dec. 18, 1962 R. MARTIN 3,069,343
MODERATOR BLOCK CONSTRUCTION FOR NUCLEAR REACTORS
Filed Aug. 10, 1959 2 Sheets-Sheet 1

Dec. 18, 1962  R. MARTIN  3,069,343
MODERATOR BLOCK CONSTRUCTION FOR NUCLEAR REACTORS
Filed Aug. 10, 1959  2 Sheets-Sheet 2

United States Patent Office 3,069,343
Patented Dec. 18, 1962

3,069,343
MODERATOR BLOCK CONSTRUCTION FOR NUCLEAR REACTORS
Roger Martin, Paris, France, assignor to Commissariat a l'Energie Atomique, Paris, France
Filed Aug. 10, 1959, Ser. No. 832,545
Claims priority, application France Aug. 21, 1958
11 Claims. (Cl. 204—193.2)

The present invention is concerned with improvements in or relating to nuclear reactors and more partciularly nuclear reactors of the solid-moderated kind.

It is known that, in large solid-moderator atomic piles wherein the ducts are vertical, the active portion within which the nuclear reactions occur consists of a large block made of, for example, graphite, pierced with numerous vertical ducts wherein the cooling fluid circulates, and where the fuel elements are located.

The graphite block generally consists of a stack of blocks having a shape similar to a parallelepiped of almost square cross-section, and of a length much greater than its width (three to eight times); these blocks are shaped by extrusion.

The said stack forms practically the only resistant structure at the centre of the pile, and must for this reason exhibit the following mechanical and geometrical properties:

The stack must be sufficiently stable and mechanically resistant to enable the pile to be used;

These properties must be retained for long enough to enable the cost of construction to be paid off;

The ducts in which the cooling fluid circulates, and where the elements of fissionable material are situated, must preserve sufficient continuity to enable the said elements to be reliably cooled, and to allow loading and unloading to be carried out conveniently; in particular, there must not be any play or discontinuity which would cause leaks, reductions in cross-section or jamming;

The same must apply to the other cavities in the stack, which serve to accommodate adjusting, control and safety appliances etc., as required by operation of the pile.

The fitness of graphite for enabling such conditions to be attained is greatly reduced by the following facts, which are bound up with the properties of graphite, and with operation of the pile.

The graphite used, which is shaped by extrusion, is an anistropic material whereof the preferred axis is that of extrusion (longitudinal direction): in particular, the coefficient of expansion is generally much lower in this direction than in a direction perpendicular thereto;

A large quantity of heat is given off in the active portion of the pile during operation, thus causing the graphite to operate at appreciably above ambient temperature. During stoppages, the graphite cools to ambient temperature: the stack is consequently subjected to successive heating and cooling corresponding to operating and rest periods, and constituting thermal cycling during which the dimensions of the graphite blocks vary almost periodically;

The graphite situated at the centre of a pile in operation is subjected to all the nuclear radiation. A fraction of the latter, chiefly high-velocity neutrons, cause positive expansion or negative expansion (contraction) of the graphite, generally known by the name of Wigner effect.

This expansion is much greater than that due to temperature, since it may reach several percent. Such deformation is also anisotropic; the Wigner expansion is generally less in the direction parallel to the extrusion axis. It varies from one point to another inside the stack as a function of temperature and the amount of radiation received. It becomes greater in proportion as the irradiation temperature decreases.

The first stacks embodied were compact, that is to say the graphite blocks were stacked against one another, with their beds crossed or parallel, horizontally or vertically; they were characterised in that the Wigner expansion was cumulative, and that the external dimensions of the stack could consequently vary in large proportions. In consequence of the mixed nature of the phenomenon, the ducts then assumed longitudinally semi-curvilinear profiles which were liable to hinder movement of the check-rods and circulation of the fuel elements.

An attempt has been made to guard against this effect by devising stacks wherein the graphite blocks are fitted up with play between them in the direction transverse with respect to the extrusion axis. Spacing between the said rods is maintained by various devices described more particularly in British Patents Nos. 784,291; 784,292 and 785,876.

However, the various solutions advocated exhibited, inter alia, the following disadvantages:

Considerable wastage of material, due to the extensions required at the ends of each rod and each brickette in order to cut out the tenons;

Considerable leaks of gas between the ducts and interstices via the play between the tenons and mortises;

Packings in a multiplicity of planes (three per bed), thus aggravating the two preceding disadvantages;

Possibility of vertical creeping in a column in consequence of irreversible movement due to friction;

Asymmetrical deformation of the profile of the ducts, leading to the appearance of discontinuities, because the Wigner effect is anisotropic, and because the extrusion axis is disposed in a different direction in the rods and in the brickettes;

Deformation in the profile of the check-rod ducts, because the degree of Wigner expansion in the brickettes is not constant.

According to the present invention there is provided a nuclear reactor including a stack of blocks of solid moderator material, the blocks being stacked in vertical columns and each block including a vertical duct therethrough communicating with the duct of the block or blocks above and/or below in the column, each block being located by parallel-faced keys received by recesses out of communication with the duct, one in each edge of each horizontal end face which lies adjacent the edge of an adjacent block or blocks and by struts lying in horizontal channels and between keys of adjacent blocks in the stack.

According to a further feature of the present invention there is provided a nuclear reactor including a stack of blocks of solid moderator material, the blocks being parallelepipeds and being stacked in vertical columns, each having a duct vertically therethrough communicating with the duct of the adjacent block or blocks in the column, and each block being located relative to the adjacent block or blocks in the column and to adjacent blocks in adjacent columns by parallel-faced keys received with their parallel faces vertical by recesses provided in and substantially perpendicular to each horizontal edge of a block lying adjacent the horizontal edge of an adjacent block, struts extending in horizontal channels between vertical faces of keys of adjacent blocks, and the recesses being in each block not communicating with the duct in that block.

The keys may be of circular, polygonal or mixed outline. In a square-meshed network, it will be seen that each group of four keys affects ten adjacent rods. The depth of the notches which receive the keys is limited to a minimum, so that slight rotation of the blocks about their axis does not exert any bending torque on the keys.

The said keys may be made of graphite: the extrusion direction must then be parallel to their faces, so that the play between them and their recess does not increase with irradiation. Their thickness is reduced to the minimum compatible with resistance to shear. In fact, irradiation increases their thickness, and produces a slight increase in the diameter of the stack.

The median planes of the key-recesses pass through the axis of the duct. They may be perpendicular to the lateral faces of the blocks, or inclined at 2 or 3 degrees with respect thereto. In this latter case, interstitial play is bounded by non-aligned planes, thus limiting the migration of neutrons. Two superposed bars are advantageously disposed in two crossed directions for the same reason.

The struts may be made of graphite; in this case, their axes must be parallel to the direction of minimum Wigner expansion, which is frequently the same as the extrusion direction. In addition, it is convenient only to hollow out two parallel half-channels at the head of a block, and two half-channels perpendicular to the foregoing at the foot of the block which it supports: this prevents any interference between perpendicular struts.

The fact that these pieces are small enables consideration to be given to methods of manufacturing the graphite which lead to a low degree of Wigner expansion. The use of graphite of low density or moderate purity may be considered in view of their small relative volume.

It is advantageous to leave a small space between the struts and their recess in order to insulate them thermally from the large blocks which are cooled by the gas circulating in the ducts. The energy set up in the struts by neutron bombardment enables them to be kept at a higher temperature, with a consequent improvement in their mechanical resistance, and reduction in their degree of Wigner expansion.

This result is easily obtained by cutting away the struts so that they only bear at the ends by way of suitable shoulders. Play is left between the struts and their recess in order to enable adjacent rods to expand laterally and move vertically.

The struts may be made of any other material which is insensitive, or only slightly sensitive to the Wigner effect, and which exhibits acceptable mechanical and nuclear properties. In particular, the small volume of these pieces allows expensive products to be used.

It is conventional to cause the control-rods to move in ducts hollowed out at the centre of gravity of squares, each of which is formed by a mesh of the network. In the configuration according to the invention, it will be seen that such a duct would interfere with the struts. This difficulty is circumvented by interrupting the struts at this point, and causing them to bear against a ring, made of beryllium for example, and of a thickness which is so determined as to resist buckling by compression. In fact, beryllium has a low co-efficient of thermal expansion and a small neutron-capture cross-section.

The said ring rests on a graphite shoulder, and play is left between it and the adjacent blocks in order to allow for thermal expansion and Wigner expansion.

The compensated zone according to the invention may extend to the whole stack, or may be limited to the zone in which Wigner expansion is at a maximum. Zones may also be imagined in which there are different amounts of play between blocks, such amounts being a function of irradiation and temperature. There is no difficulty in passing from a compensated zone to a non-compensated zone.

The whole of the stack to which the invention relates rests on a plane metal bearer spiked with metal pieces in the form of half-keys. The said bearer is pierced with holes facing the ducts in order to allow the gas to pass. A strainer fast with the bearer enables the fuel elements to be supported, and the delivery of cooling fluid to be regulated. The whole is held together by elastic girdles, such as those described in French Patent No. 1,190,048 in the name of the Commissariat à l'Energie Atomique.

In the case of a stack comprising a centred hexagonal network, formed by juxtaposing hexagonal-based prismatic blocks bored along their axis, the struts must necessarily be made of a material which is only slightly or not sensitive to the Wigner effect in two perpendicular directions: they then assume a triangular shape, and bear against radial keys, six in number per graphite block.

The invention yields many advantages:

The number of planes in which packings are disposed is reduced to one per bed, instead of three in certain earlier systems. The causes of cooling-gas leaks are therefore reduced in the same proportion;

For given graphite-rod cross-sections, the contact surface between two superposed blocks is greater than in arrangements using sealing washers: this results in greater stability;

The known method of assembly by tenons and mortises involved considerable loss of material; in addition, such methods of assembly were an additional source of leaks (in the absence of sealing washers). Elimination of these washers enables the volume of lost material, or "cuttings," to be reduced;

The struts according to the invention occupy a much smaller volume than the tiles or brickettes which fulfill a similar function. It is therefore possible to make them of a material which offers greater mechanical resistance, and is less sensitive to the Wigner effect, such as non-nuclear graphite for example;

If they are thermally insulated by a gaseous screen (of the same nature as the cooling fluid), the struts may be kept at a higher temperature than the rods themselves: this heating has the advantage of improving their mechanical properties and reducing the Wigner effect if the said struts are made of graphite;

The co-efficient of friction of graphite on graphite is not well known when operation is being carried out in a dry atmosphere and under radiation; the invention enables the disadvantages and uncertainties bound up with such friction to be eliminated;

The columns are strictly independent, which constitutes an enormous advantage. In fact, in brickette systems, if a column expands vertically more than its neighbour or neighbours because of exceptional local heating, it may not be able to return to its normal position after the expansion caused by such heating because it is jammed by being gripped between the adjacent blocks: this is the phenomenon of vertical creeping, which is a cause of leaks.

This risk is eliminated. In fact, if one of the rods lifts the spacing between columns remains constant, and it will therefore fall back into position of its own accord whatever the co-efficient of friction. Leaks of cooling gas are thus avoided. It becomes possible to reduce the amount of ballast in the form of cast plates which is usually disposed above the stack. The elastic girdles which hold the whole together may be lightened;

The ducts remain continuous and centred in all circumstances, and their profile remains circular;

The control-rod ducts will still remain usable, since no row of blocks can be laterally displaced with respect to another;

Finally, the blocks may easily be machined by milling, and the quantity of material lost is reduced to a minimum. The bearing surfaces are trued in a single operation, since they do not comprise any projection. The absence of repetition makes the surfaces more plane, and consequently more fluid-tight.

The assembly pieces (washers and struts) are easy to machine, and the number of types of pieces is limited to three in the ordinary parts of the stack (blocks, keys and struts). It will be particularly noted that the superposed blocks are crossed by simply turning back an ordinary block.

In order that the present invention may be well understood there will now be described one embodiment thereof, given by way of example only, reference being had to the accompanying drawings in which FIGURE 1 is an exploded perspective diagrammatic view of an assembly according to the invention.

Figure 2:
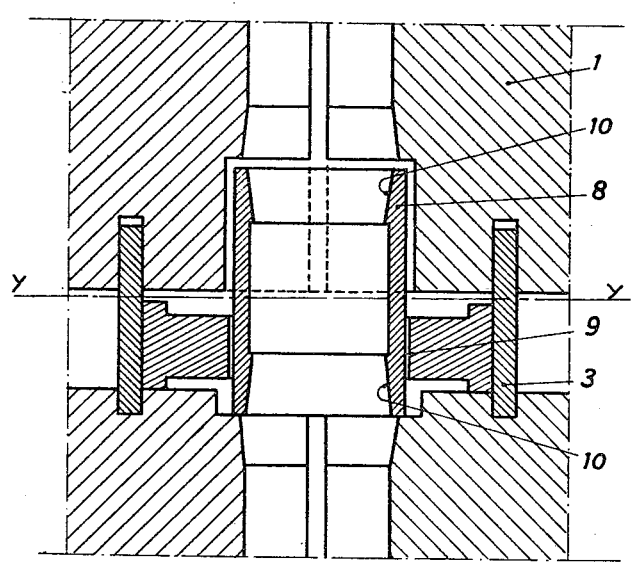
Figure 3:
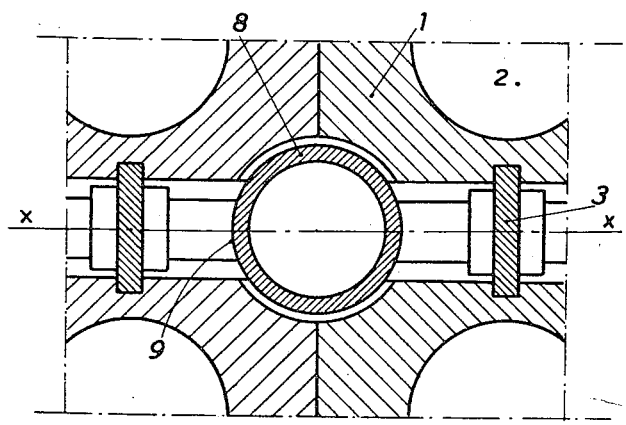

FIGURES 2 and 3 are a sectional elevation along XX in FIGURE 3 and a horizontal section along YY in FIGURE 2 respectively of the transition from a duct to a packing plane, according to the invention. In the particular example shown in FIGURES 2 and 3, the said duct is used to allow a control rod to pass.

Only the elements required for an understanding of the invention are illustrated in these figures, corresponding elements in these different figures bearing identical reference numbers.

As may be seen in FIGURE 1, the stack being considered is a square-pitch vertical stack. It consists of graphite blocks such as 1, axially pierced in the longitudinal direction, in order to produce a vertical duct 2.

Assuming the lower bed to be in position, a block of the lower bed is fitted, according to the invention, in the following manner:

The four keys such as 3 are in position in their notches 4. These four keys provide a first connection between the lower block and its neighbours. They are of slightly smaller diameter than the recess formed as the four blocks approach one another, in order to allow for inequalities in vertical displacement.

The struts 5 are themselves disposed on two levels in order to form a square pattern. They are situated in troughs 6 formed by bringing together two suitable cut away adjacent blocks. The end of each strut is in contact with two keys 3, thus enabling forces to be transmitted (FIGURE 1).

Each end of each strut 5 has a reinforcement 7 in order thermally to insulate the strut from the adjacent blocks. These ends may be plane, or preferably slightly convex in order to allow for slight relative vertical displacement between columns; in this case, the keys 3 have suitably profiled concave portions. It is important to note that the bearing surfaces of the said struts 5 are themselves also fitted with considerable play in order to allow the columns to approach one another without any possible jamming when Wigner expansion occurs. The problem of enabling the control rods to pass is simply solved (see FIGURES 2 and 3). It is known that these control rods are fitted at the junction points of four columns. In order to ensure that the duct is continuous at the level of the struts, a very slightly absorbent metal tube 8 (made of beryllium for example) is placed in position, and caused to work in compression; the shorter struts in this position bear against the said tube at 9.

The said tube comprises circular bevelled portions such as 10 in order to allow for differential expansion of the graphite and beryllium ducts without introducing any discontinuity prejudicial to free circulation of the checkrods.

What is claimed is:

1. In a moderator structure for nuclear reactors, a plurality of solid bars of moderator material each having a centrally disposed passage therethrough and stacked in regular pattern in layers with the passages in communication forming a vertically disposed duct, each of said bars being of identical prismatic shape, upper and lower surfaces for each of said bars with adjacent upper and lower surfaces of adjacent bars in direct contact, opposed notches in adjacent edges of adjacent faces of adjacent bars, a flattened key in each of said opposed notches, troughs formed in said bars adjacent said notches and struts mounted in said troughs bearing on adjacent one of said keys, said struts being arranged in parallel planes in patterns which are perpendicular to each other to maintain the alignment of said duct.

2. Moderator structure as defined in claim 1 in which a pair of said troughs are formed parallel to each other in the edges of the upper surface of one of said bars and a pair of said troughs are formed parallel to each other in the edges of the lower surface of the bar thereabove at right angles to said first pair of troughs to prevent interference between the struts mounted in said troughs.

3. Moderator structure as described in claim 1 in which said bars are square in cross-section.

4. Moderator structure as described in claim 1 in which said keys are graphite.

5. Moderator structure as described in claim 1 in which said struts are cylindrical.

6. Moderator structure as described in claim 1 in which said struts are graphite and have their axes parallel to the direction of minimum Wigner expansion.

7. Moderator structure as described in claim 1 including control rod passages vertically disposed through the lines of contact of four adjacent bars, tubes in said passages between adjacent layers of said bars, adjacent ones of said struts engaging the adjacent tube.

8. Moderator structure as described in claim 7 in which said tubes are beryllium.

9. Moderator structure as defined in claim 1 in which each of said keys fits loosely in said opposed notches to permit slight rotation of said bars about their vertical axes and each of said keys interconnects four adjacent ones of said bars.

10. Moderator structure as described in claim 9 in which vertical and lateral play is provided at the extremities of each of said keys to permit Wigner expansion of said bars and said struts.

11. Moderator structure as described in claim 9 in which each of said keys has parallel opposed straight edges with rounded ends.

References Cited in the file of this patent

UNITED STATES PATENTS 2,864,759     Long et al. _____ Dec. 16, 1958
2,872,398     Ashley et al. _____ Feb. 3, 1959

OTHER REFERENCES

Grant: Hackh's Chemical Dictionary, 1950, page 123, The Blakiston Company.